United States Patent
Wu et al.

(10) Patent No.: US 10,732,867 B1
(45) Date of Patent: Aug. 4, 2020

(54) BEST PRACTICE SYSTEM AND METHOD

(71) Applicant: EMC IP Holding Company, LLC, Hopkinton, MA (US)

(72) Inventors: Eric Zhanqing Wu, Shanghai (CN); Haitao Kenny Zhou, Shanghai (CN); Jun Wu, Shanghai (CN); Yourong Wang, Shanghai (CN); Michael G. Varteresian, Lexington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 146 days.

(21) Appl. No.: 15/656,764

(22) Filed: Jul. 21, 2017

(51) Int. Cl.
 *G06F 12/00* (2006.01)
 *G06F 3/06* (2006.01)
 *G06F 13/00* (2006.01)
 *G06F 13/28* (2006.01)

(52) U.S. Cl.
 CPC .......... *G06F 3/0631* (2013.01); *G06F 3/0604* (2013.01); *G06F 3/067* (2013.01)

(58) Field of Classification Search
 CPC ....... G06F 3/0631; G06F 3/0604; G06F 3/067
 See application file for complete search history.

(56) References Cited

U.S. PATENT DOCUMENTS

| | | | | |
|---|---|---|---|---|
| 6,944,759 | B1 * | 9/2005 | Crisan | G06F 8/64 702/123 |
| 8,954,574 | B1 * | 2/2015 | Chheda | G06Q 20/085 709/220 |
| 9,924,044 | B2 * | 3/2018 | Chen | G06Q 30/02 |
| 2003/0204588 | A1 * | 10/2003 | Peebles | G06F 11/0709 709/224 |
| 2006/0085785 | A1 * | 4/2006 | Garrett | G06F 9/5061 718/1 |
| 2008/0052327 | A1 * | 2/2008 | Buah | G06F 11/1482 |
| 2008/0133681 | A1 * | 6/2008 | Jackson | G06F 11/0709 709/206 |
| 2009/0077213 | A1 * | 3/2009 | Nedwich | H04L 41/5041 709/223 |
| 2009/0281819 | A1 * | 11/2009 | Garg | G06N 5/04 705/309 |
| 2011/0173302 | A1 * | 7/2011 | Rider | G06F 9/44505 709/220 |
| 2015/0220837 | A1 * | 8/2015 | Polehn | G06N 5/047 706/12 |
| 2016/0274744 | A1 * | 9/2016 | Neumann | H04N 21/252 |

\* cited by examiner

*Primary Examiner* — Mark A Giardino, Jr.
(74) *Attorney, Agent, or Firm* — Brian J. Colandreo; Mark H. Whittenberger; Holland & Knight LLP

(57) ABSTRACT

A method, computer program product, and computing system for receiving usage and configuration data from a storage system. The usage and configuration data is compared to one or more best practice models to determine one or more recommendations. The one or more recommendations are provided to a user of the storage system.

18 Claims, 4 Drawing Sheets

BEST PRACTICE SYSTEM AND METHOD

TECHNICAL FIELD

This disclosure relates to best practice systems and methods and, more particularly, to best practice systems and methods for use within data storage systems.

BACKGROUND

Storing and safeguarding electronic content is of paramount importance in modern business. Accordingly, various methodologies may be employed to protect such electronic content. One such methodology is to utilize high availability systems to reduce the likelihood of data loss. As would be expected, such high availability systems are often quite complex.

Unfortunately, once these systems are installed and initially configured, problems may occur if e.g., changes are made to the manner in which these systems are utilized, which may result in the system now being insufficiently configured or overly utilized.

SUMMARY OF DISCLOSURE

In one implementation, a computer-implemented method is executed on a computing device and includes receiving usage and configuration data from a storage system. The usage and configuration data is compared to one or more best practice models to determine one or more recommendations. The one or more recommendations are provided to a user of the storage system.

One or more of the following features may be included. The usage and configuration data may include hardware utilization data that identifies the manner in which one or more hardware components are utilized within the storage system. The usage and configuration data may include high availability utilization data that identifies the manner in which one or more high availability processes are utilized within the storage system. The usage and configuration data may include virtual object utilization data that identifies the manner in which one or more virtual objects are utilized within the storage system. Comparing the usage and configuration data to one or more best practice models may include identifying anomalous behavior within the usage and configuration data. Providing the one or more recommendations to a user of the storage system may include providing the one or more recommendations to a user of the storage system via a cloud-based computing platform. The one or more best practice models may be received from a remote source.

In another implementation, a computer program product resides on a computer readable medium and has a plurality of instructions stored on it. When executed by a processor, the instructions cause the processor to perform operations including receiving usage and configuration data from a storage system. The usage and configuration data is compared to one or more best practice models to determine one or more recommendations. The one or more recommendations are provided to a user of the storage system.

One or more of the following features may be included. The usage and configuration data may include hardware utilization data that identifies the manner in which one or more hardware components are utilized within the storage system. The usage and configuration data may include high availability utilization data that identifies the manner in which one or more high availability processes are utilized within the storage system. The usage and configuration data may include virtual object utilization data that identifies the manner in which one or more virtual objects are utilized within the storage system. Comparing the usage and configuration data to one or more best practice models may include identifying anomalous behavior within the usage and configuration data. Providing the one or more recommendations to a user of the storage system may include providing the one or more recommendations to a user of the storage system via a cloud-based computing platform. The one or more best practice models may be received from a remote source.

In another implementation, a computing system includes a processor and memory is configured to perform operations including receiving usage and configuration data from a storage system. The usage and configuration data is compared to one or more best practice models to determine one or more recommendations. The one or more recommendations are provided to a user of the storage system.

One or more of the following features may be included. The usage and configuration data may include hardware utilization data that identifies the manner in which one or more hardware components are utilized within the storage system. The usage and configuration data may include high availability utilization data that identifies the manner in which one or more high availability processes are utilized within the storage system. The usage and configuration data may include virtual object utilization data that identifies the manner in which one or more virtual objects are utilized within the storage system. Comparing the usage and configuration data to one or more best practice models may include identifying anomalous behavior within the usage and configuration data. Providing the one or more recommendations to a user of the storage system may include providing the one or more recommendations to a user of the storage system via a cloud-based computing platform. The one or more best practice models may be received from a remote source.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
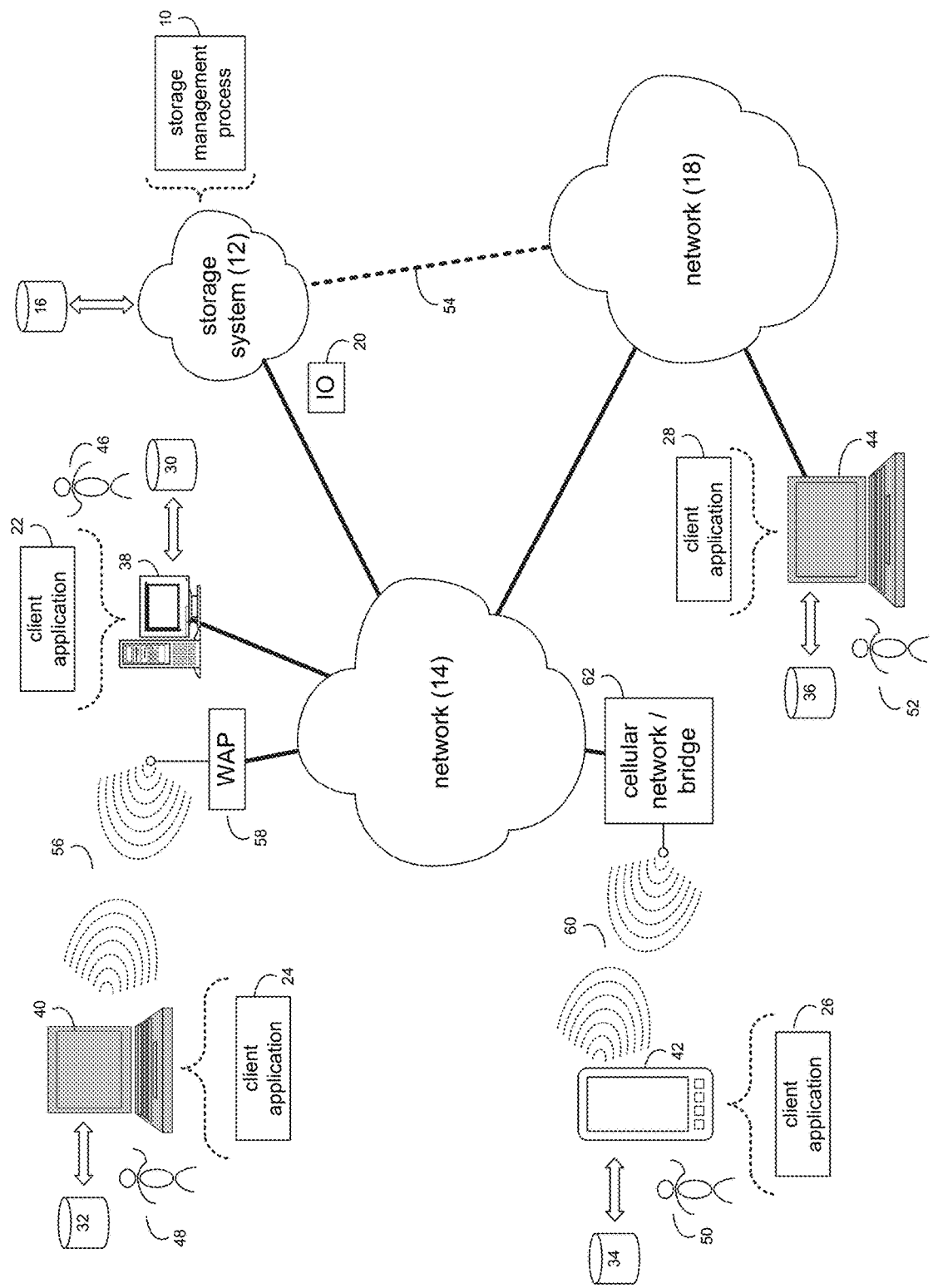
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
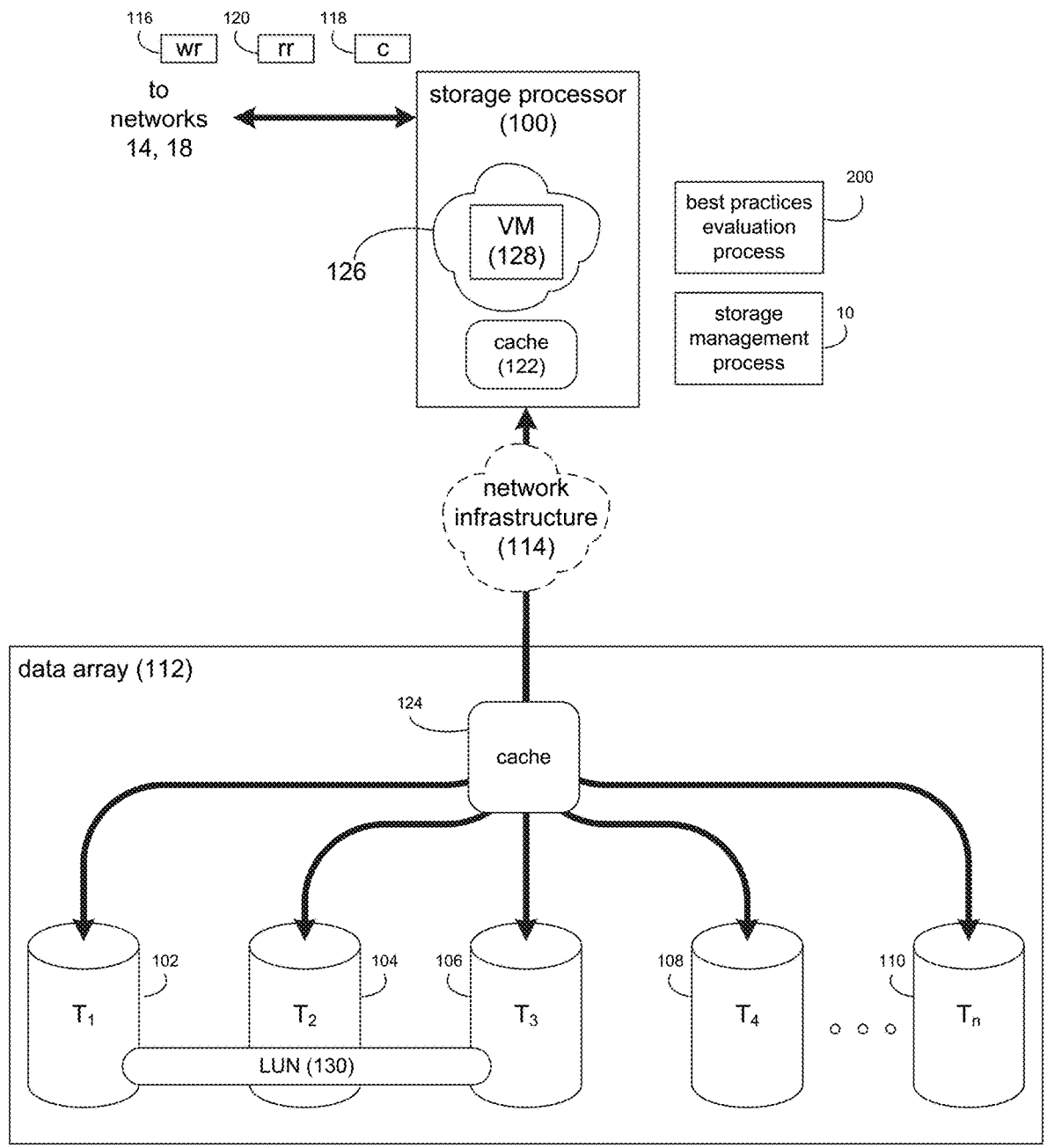
FIG. 2 is a diagrammatic view of another implementation of the storage system of FIG. 1.

Referring also to FIG. 2, there is shown one particular implementation of storage system 12. Storage system 12 may include storage processor 100 and a plurality of storage targets Ti-a (e.g. storage targets 102, 104, 106, 108, 110). Storage targets 102, 104, 106, 108, 110 may be configured to provide various levels of performance and/or high availability. For example, one or more of storage targets 102, 104, 106, 108, 110 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108, 110 may be configured as a RAID 1 array, in which data is mirrored between storage targets. By mirroring data between storage targets, a level of high availability is achieved as multiple copies of the data are stored within storage system 12.

While storage targets 102, 104, 106, 108, 110 are discussed above as being configured in a RAID 0 or RAID 1 array, this is for illustrative purposes only and is not intended to be a limitation of this disclosure, as other configurations are possible. For example, storage targets 102, 104, 106, 108, 110 may be configured as a RAID 3, RAID 4, RAID 5 or RAID 6 array.

While in this particular example, storage system 12 is shown to include five storage targets (e.g. storage targets 102, 104, 106, 108, 110), this is for illustrative purposes only and is not intended to be a limitation of this disclosure. Specifically, the actual number of storage targets may be increased or decreased depending upon e.g. the level of redundancy/performance/capacity required.

One or more of storage targets 102, 104, 106, 108, 110 may be configured to store coded data. As is known in the art, coded data may allow for the regeneration of data lost/corrupted on one or more of storage targets 102, 104, 106, 108, 110.

Examples of storage targets 102, 104, 106, 108, 110 may include one or more electro-mechanical hard disk drives and/or one or more solid-state/flash devices, wherein a combination of storage targets 102, 104, 106, 108, 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108, 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108, 110 may be a RAID device and/or computer-based hard disk drives. Further still, one or more of storage targets 102, 104, 106, 108, 110 may be a SAN.

In the event that storage system 12 is configured as a SAN, the various components of storage system 12 (e.g. storage processor 100, storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

The Storage Management Process:

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. Additionally, some or all of the instruction sets and subroutines of storage management process 10 may be executed by one or more processors (not shown) and one or more memory architectures (not shown) included within data array 112.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100 and storage management process 10. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 and storage management process 10 may initially store content 118 within frontend cache memory system 122. Depending upon the manner in which frontend cache memory system 122 is configured, storage processor 100 and storage management process 10 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 and storage management process 10 may initially store content 118 within backend cache memory system 124 prior to being stored on e.g. one or more of storage targets 102, 104, 106, 108, 110.

Figure 3:
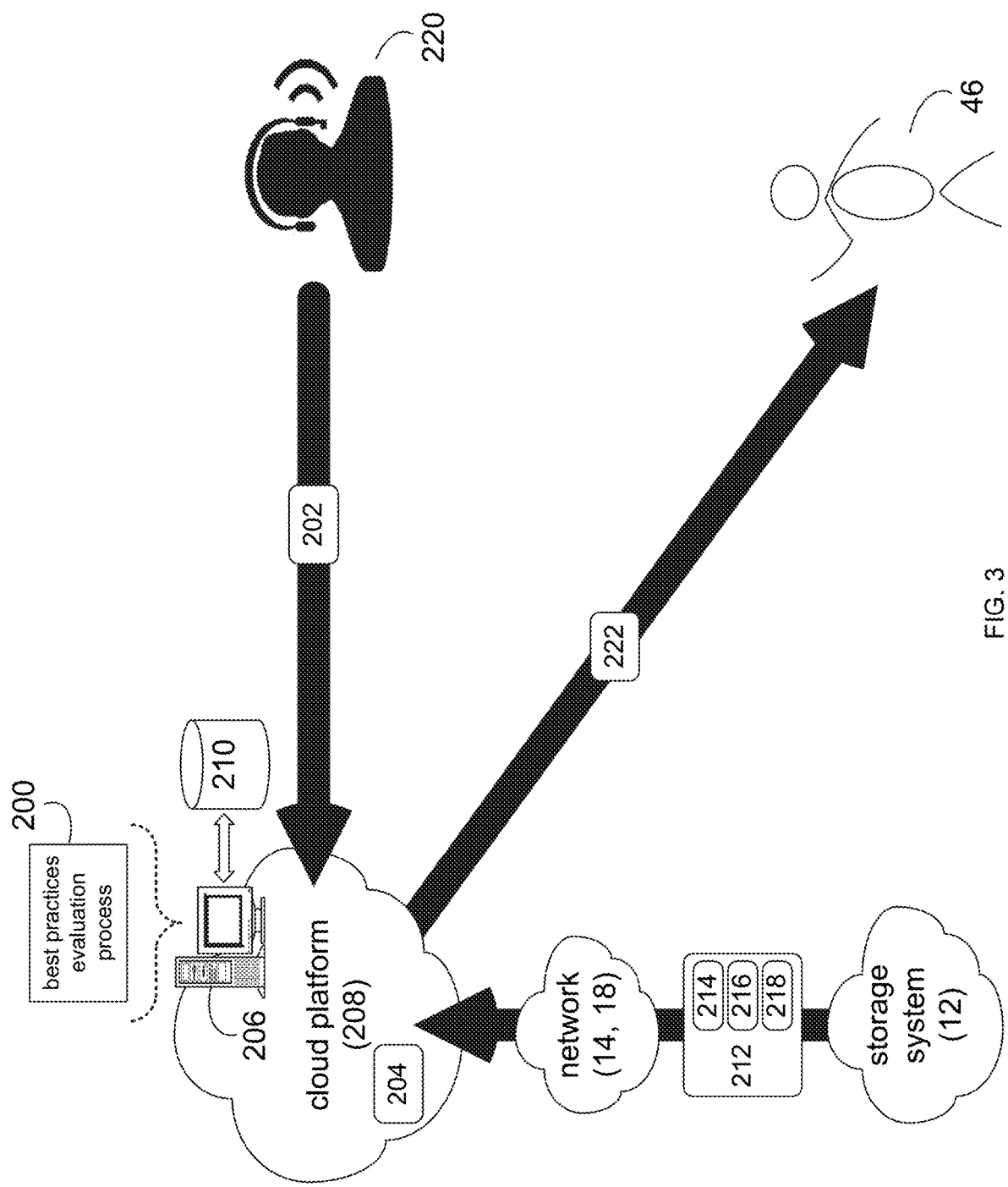
FIG. 3 is a diagrammatic view of another implementation of the storage system of FIG. 1 and a best practices evaluation process.

Best Practices Evaluation Process:

Referring also to FIG. 3 and as will be discussed below in greater detail, best practices evaluation process 200 may be configured to monitor the operation of storage systems (e.g., storage systems 12) and the various subsystems described above (e.g., storage processor 100, network infrastructure 114 and/or the data array 112) to ensure that they are configured properly and functioning in a manner that adheres to established best practices (e.g., established best practice models 202). And in the event that best practices evaluation process 200 determines that storage system 12 (or portions thereof) are configured in a manner that does not adhere to these best practices (e.g., established best practice models 202), one or more parties (e.g., one or more of users 46, 48, 50, 52) associated with storage system 12 may be provided with recommendations 204 in the form of e.g., a text message, an email message, or a report.

Best practices evaluation process 200 may be a server application and may reside on and may be executed by computing device 206, examples of which may include, but are not limited to: a personal computer, a server computer, a series of server computers, a mini computer, or a mainframe computer. Computing device 206 may be a portion of (or included within) a cloud-based computing platform (e.g., cloud platform 208), which may be coupled to one or more computing networks (e.g., computing network 14 and/or computing network 18), thus allowing best practices evaluation process 200 to communicate with storage system 12.

The various components of best practices evaluation process 200 may execute one or more operating systems, examples of which may include but are not limited to: Microsoft Windows Server™; Redhat Linux™, Unix, or a custom operating system, for example.

The instruction sets and subroutines of best practices evaluation process 200, which may be stored on storage device 210 coupled to computing device 206, may be executed by one or more processors (not shown) and one or more memory architectures (not shown) included within computing device 206. Storage device 210 may include but is not limited to: a hard disk drive; a tape drive; an optical drive; a RAID device; a random access memory (RAM); a read-only memory (ROM); and all forms of flash memory storage devices.

Figure 4:
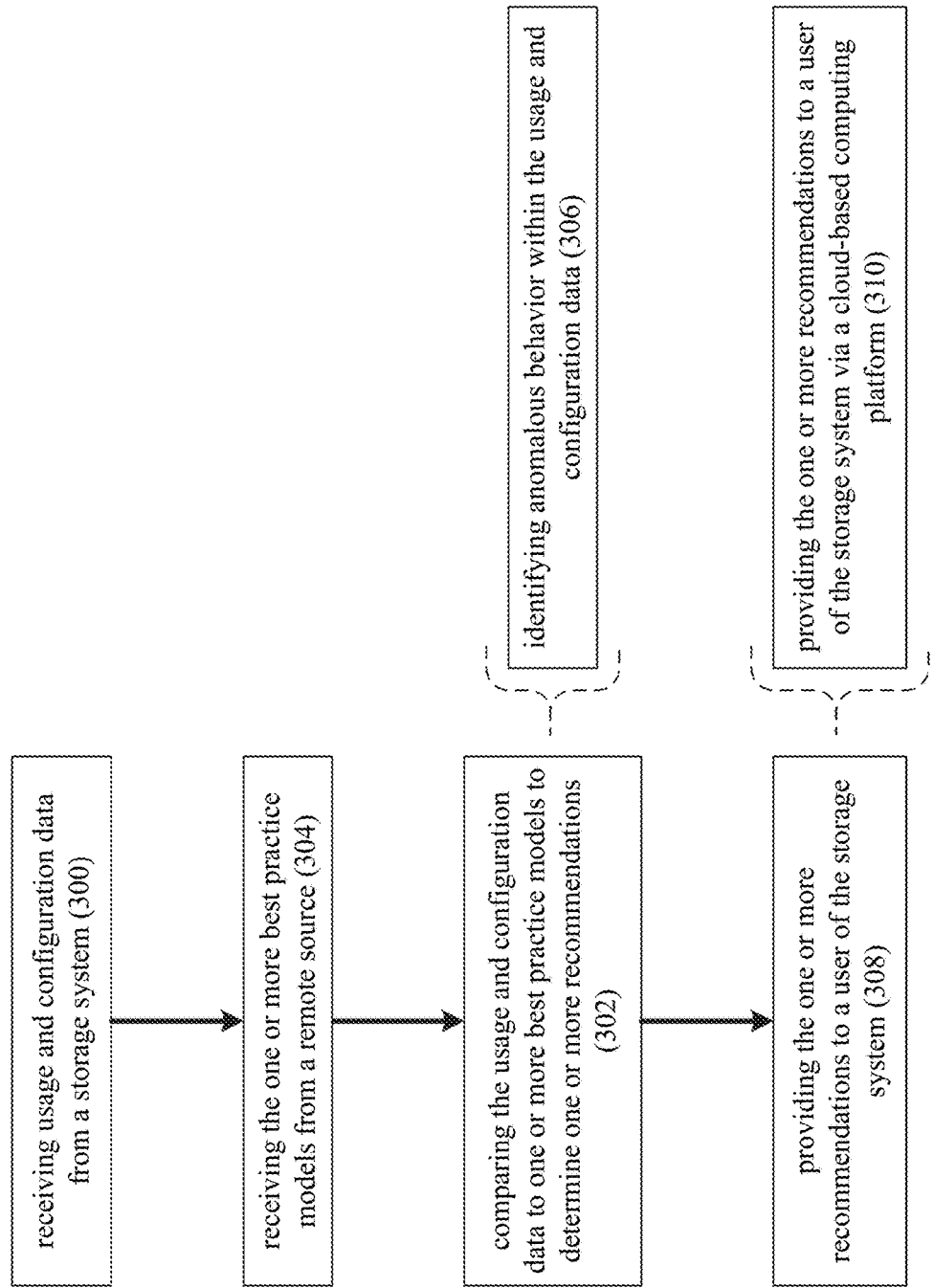
FIG. 4 is a flow chart of the best practices evaluation process of FIG. 3.

Referring also to FIG. 4, best practices evaluation process 200 may receive 300 usage and configuration data 212 from storage system 12. As discussed above, storage system 12 may include various subsystems (e.g., storage processor 100, network infrastructure 114 and/or the data array 112), wherein data array 112 may include one or more of storage targets 102, 104, 106, 108, 110.

Depending on the manner in which storage system 12 is configured, storage system 12 may be configured to execute virtual machine operating environment 126. An example of virtual machine operating environment 126 may include but is not limited to a hypervisor, which is an instantiation of an operating/file system that may allow for one or more virtual machines (e.g., virtual machine 128) to operate within a single physical device. Accordingly, the combination of virtual machine operating environment 126 and virtual machine 128 may allow one or more users to access the resources of storage processor 100 (and one or more additional storage processors, not shown) and data array 112 (and one or more additional data arrays, not shown). Through the use or storage system 12 and/or virtual machine operating environment 126, one or more LUNs (e.g., LUN 130) may be defined.

As is known in the art, LUN is an acronym for Logical Unit Number, which is a unique identifier that may designate one or more physical or virtual storage devices that are configured to execute I/O commands on a host computer. Typically, a logical unit number (i.e., a LUN) is assigned when a host scans a SCSI device and discovers a logical unit, wherein the LUN may identify the specific logical unit to e.g., a SCSI initiator (not shown). Although (technically) the term LUN is only the identifying number of a logical unit, the IT industry commonly uses LUN as shorthand to refer to the logical unit itself.

While in this example, LUN 130 is a logical storage unit that is constructed from portions of storage targets 102, 104, 106, this is for illustrative purposes only and is not intended to be a limitation of this disclosure, as other configurations are possible and are considered to be within the scope of this disclosure. For example, LUN 130 may be a portion of a single storage target, an entire storage target, or portions of multiple storage targets. Accordingly, it is understood that LUN 130 may refer to an entire RAID set, a single storage target (or storage partition), or multiple storage targets (or storage partitions).

Hardware Utilization Data

Usage and configuration data 212 received 300 by best practices evaluation process 200 may include hardware utilization data 214 that identifies the manner in which one or more hardware components are utilized within storage system 12. As discussed above, storage system 12 may include various subsystems (e.g., storage processor 100, network infrastructure 114 and/or the data array 112), wherein data array 112 may include one or more of storage targets 102, 104, 106, 108, 110. Therefore, hardware utilization data 214 may include information concerning the hardware components of storage system 12.

Accordingly, hardware utilization data 214 may define RAM (e.g., maximum installable, currently installed, average usage and maximum usage), cache (e.g., maximum installable, currently installed, average usage and maximum usage), storage space (e.g., maximum installable, currently installed, average usage and maximum usage), power supply systems (e.g., maximum installable, currently installed, average usage and maximum usage), network adapters (e.g., maximum installable, currently installed, average usage and maximum usage), processor modules (e.g., maximum installable, currently installed, average usage and maximum usage) and host bus adapters (e.g., maximum installable, currently installed, average usage and maximum usage).

Assume (for this example) that hardware utilization data 214 defines RAM data (e.g., maximum installable of 2048 gigabytes, currently installed of 1024 gigabytes, average usage of 612 gigabytes, and maximum usage of 916 gigabytes), cache data (e.g., maximum installable 256 gigabytes, currently installed 128 gigabytes, average usage of 116 gigabytes and maximum usage of 128 gigabytes) and storage data (e.g., maximum installable of 1024 terabytes, currently installed 512 terabytes, average usage of 501 terabytes and maximum usage of 510 terabytes).

High Availability Utilization Data

Usage and configuration data 212 received 300 by best practices evaluation process 200 may include high availability utilization data 216 that identifies the manner in which one or more high availability processes are utilized within storage system 12. As discussed above, storage system 12 may be configured to provide a high level of available. For example, storage targets 102, 104, 106, 108, 110 may be configured to provide various levels of performance and/or high availability. Therefore, high availability utilization data 216 may include information concerning the manner in which storage system 12 is configured for high availability.

Accordingly, high availability utilization data 216 may define storage device high availability (e.g., current configuration, alternative configurations, hot spare drives), network infrastructure high availability (e.g., current configuration and alternative configurations), storage processor high availability (e.g., current configuration and alternative configurations) and cache high availability (e.g., current configuration and alternative configurations).

Assume (for this example) that high availability utilization data 216 defines storage device high availability (e.g., current configuration of RAID 5, alternative configurations of RAID 6, hot spare drives of 0), network infrastructure high availability (e.g., current configuration of no redundancy and alternative configuration of one level of redundancy), storage processor high availability (e.g., current configuration of one level of redundancy and alternative configurations of two levels of redundancy) and cache high availability (e.g., current configuration of no redundancy and alternative configuration of one level of redundancy).

Virtual Object Utilization Data

Usage and configuration data 212 received 300 by best practices evaluation process 200 may include virtual object utilization data 218 that identifies the manner in which one or more virtual objects are utilized within storage system 12. As discussed above, storage system 12 may be configured to effectuate virtual machines, operating/file systems and LUNs. Therefore, virtual object utilization data 214 may include information concerning the virtual components of storage system 12.

Accordingly, virtual object utilization data 218 may define virtual machines (e.g., maximum allowed, average generated and maximum generated); file systems (e.g., maximum allowed, average generated and maximum generated), LUNs (e.g., maximum allowed, average generated and maximum generated), and operating systems (e.g., maximum allowed, average generated and maximum generated).

Assume (for this example) that virtual object utilization data 218 defines virtual machine data (e.g., maximum allowed of 16, average generated of 14 and maximum generated of 16); file systems (e.g., maximum allowed of 32, average generated of 14 and maximum generated of 24), LUNs (e.g., maximum allowed of 128, average generated of 82 and maximum generated of 90), and operating systems (maximum allowed of 64, average generated of 28 and maximum generated of 32).

Once usage and configuration data 212 is received 300 by best practices evaluation process 200, best practices evaluation process 200 may compare 302 usage and configuration data 212 to one or more best practice models (e.g., best practice models 202) to determine one or more recommendations (e.g., recommendations 204). Best practices evaluation process 200 may receive 304 the one or more best practice models (e.g., best practice models 202) from a remote source (e.g., remote source 220). Examples of remote source 220 may include but are not limited to a single or group of support technicians, support engineers, programmers and/or software developers, wherein remote source 220 may generate best practice models 202 based upon established industry best practice norms.

For example, best practice models 202 may define:
- define RAM best practices (e.g., desired installation, average usage and maximum usage);
- cache best practices (e.g., desired installation, average usage and maximum usage);
- storage space best practices (e.g., desired installation, average usage and maximum usage);
- power supply system best practices (e.g., desired installation, average usage and maximum usage);
- network adapters best practices (e.g., desired installation, average usage and maximum usage);
- processor modules best practices (e.g., desired installation, average usage and maximum usage);
- host bus adapters best practices (e.g., desired installation, average usage and maximum usage);
- storage device high availability best practices (e.g., desired configuration);
- network infrastructure high availability best practices (e.g., desired configuration);
- storage processor high availability best practices (e.g., desired configuration);
- cache high availability best practices (e.g., desired configuration);
- virtual machine best practices (e.g., desired installation, average generated and maximum generated);
- file system best practices (e.g., desired installation, average generated and maximum generated);
- LUN best practices (e.g., desired installation, average generated and maximum generated); and
- operating system best practices (e.g., desired installation, average generated and maximum generated).

Continuing with the above-stated example, when comparing 302 usage and configuration data 212 to one or more best practice models (e.g., best practice models 202) to determine one or more recommendations (e.g., recommendations 204), best practices evaluation process 200 may compare the individual pieces of actual data (e.g., usage and configuration data 212) to the above-described exemplary individual best practices (e.g., best practice models 202) to determine recommendations 204.

Assume that best practices evaluation process 200 may identify the following issues when comparing 302 usage and configuration data 212 to the one or more best practice models (e.g., best practice models 202):
- Cache data (e.g., maximum installable 256 gigabytes, currently installed 128 gigabytes, average usage of 116 gigabytes and maximum usage of 128 gigabytes)
- Storage data (e.g., maximum installable of 1024 terabytes, currently installed 512 terabytes, average usage of 501 terabytes and maximum usage of 510 terabytes).
- Storage device high availability (e.g., current configuration of RAID 5, alternative configurations of RAID 6, hot spare drives of 0),
- Network infrastructure high availability (e.g., current configuration of no redundancy and alternative configuration of one level of redundancy),
- Cache high availability (e.g., current configuration no redundancy and alternative configuration of one level of redundancy).
- Virtual machine data (e.g., maximum allowed of 16, average generated of 14 and maximum generated of 16);

Accordingly and upon performing comparison 302, best practices evaluation process 200 may determine recommendations 204 as follows:
- Install More Cache Memory: The cache memory within storage system 12 has a maximum utilization of 100% with an average utilization of 90.6%. Since the maximum installable cache memory is 256 gigabytes and only 128 gigabytes are currently installed, recommendations 204 may include upgrading the cache memory within storage system 12.
- Install More Storage: The storage within storage system 12 has a maximum utilization of 99.6% with an average utilization of 97.8%. Since the maximum installable storage is 1024 gigabytes and only 512 gigabytes are currently installed, recommendations 204 may include upgrading the storage within storage system 12.
- Reconfigure RAID: Since data array 112 is currently configured as RAID 5 with zero hot spares, recommendations 204 may include reconfiguring data array 12 into a RAID 6 format and adding one or more hot spare drive.
- Reconfigure Network Infrastructure: Since network infrastructure 114 is currently configured to have no redundancy, recommendations 204 may include reconfiguring network infrastructure 114 to include a second (redundant) network path between storage process 100 and data array 112.
- Reconfigure Cache Infrastructure: Since cache 122, 124 is currently configured to have no redundancy, recommendations 204 may include reconfiguring cache 122, 124 to include redundant cache within storage system 12.
- Update Virtual Machine Software/Hardware: The software and/or hardware that effectuates the generation of virtual machines has a maximum utilization of 100% with an average utilization of 87.5%. Accordingly, recommendations 204 may include upgrading the software and/or hardware that effectuates the generation of virtual machines.

When comparing 302 usage and configuration data 212 to one or more best practice model models (e.g., best practice models 202), best practices evaluation process 200 may identify 306 anomalous behavior within usage and configuration data 212. For example, if the processors within storage processor 12 are 100% utilized on the first Tuesday of every month, best practices evaluation process 200 may discount this 100% utilization as it is not anomalous (since is occurs on the first Tuesday of every month).

Best practices evaluation process 200 may provide 308 the one or more recommendations (e.g., recommendations 204) to a user (e.g., user 46) of storage system 12. For example, assume that user 46 is an administrator of storage system 12. Accordingly, best practices evaluation process 200 may provide 308 user 46 (i.e., the administrator of storage system 12) with recommendations 204 in the form of e.g., a text message, an email message, or a report.

Alternatively and when providing 308 the one or more recommendations (e.g., recommendations 204) to a user (e.g., user 46) of storage system 12, best practices evaluation process 200 may provide 310 the one or more recommendations (e.g., recommendations 204) to a user (e.g., user 46) of storage system 12 via cloud-based computing platform (e.g., cloud platform 208). For example, best practices evaluation process 200 may notify user 46 of the existence of recommendations 204 via notification 222 (e.g., a text message or an email message). And in order to obtain recommendations 204, user 46 may then be required to log into cloud platform 208 to access the same.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   receiving usage and configuration data from a storage system, wherein the usage and configuration data includes high availability utilization data that identifies the manner in which one or more high availability processes configured for providing redundancy for one or more portions of the storage system are utilized within the storage system including current configurations and alternative configurations of storage device high availability, network infrastructure high availability, and cache high availability;
   comparing the usage and configuration data to one or more best practice models to determine one or more recommendations, wherein the one or more best practice models define desired configurations for the storage device high availability, the network infrastructure high availability, and the cache high availability; and
   providing the one or more recommendations to a user of the storage system.

2. The computer-implemented method of claim 1 wherein the usage and configuration data includes:
   hardware utilization data that identifies the manner in which one or more hardware components are utilized within the storage system.

3. The computer-implemented method of claim 1 wherein the usage and configuration data includes:
   virtual object utilization data that identifies the manner in which one or more virtual objects are utilized within the storage system.

4. The computer-implemented method of claim 1 wherein comparing the usage and configuration data to one or more best practice models includes:
   identifying anomalous behavior within the usage and configuration data.

5. The computer-implemented method of claim 1 wherein providing the one or more recommendations to a user of the storage system includes:
   providing the one or more recommendations to a user of the storage system via a cloud-based computing platform.

6. The computer-implemented method of claim 1 further comprising:
   receiving the one or more best practice models from a remote source.

7. A computer program product residing on a non-transitory computer readable medium having a plurality of instructions stored thereon which, when executed by a processor, cause the processor to perform operations comprising:
   receiving usage and configuration data from a storage system, wherein the usage and configuration data includes high availability utilization data that identifies the manner in which one or more high availability processes configured for providing redundancy for one or more portions of the storage system are utilized within the storage system including of current configurations and alternative configurations of storage device high availability, network infrastructure high availability, and cache high availability;
   comparing the usage and configuration data to one or more best practice models to determine one or more recommendations, wherein the one or more best practice models define desired configurations for the storage device high availability, the network infrastructure high availability, and the cache high availability; and
   providing the one or more recommendations to a user of the storage system.

8. The computer program product of claim 7 wherein the usage and configuration data includes:
   hardware utilization data that identifies the manner in which one or more hardware components are utilized within the storage system.

9. The computer program product of claim 7 wherein the usage and configuration data includes:
   virtual object utilization data that identifies the manner in which one or more virtual objects are utilized within the storage system.

10. The computer program product of claim 7 wherein comparing the usage and configuration data to one or more best practice models includes:
    identifying anomalous behavior within the usage and configuration data.

11. The computer program product of claim 7 wherein providing the one or more recommendations to a user of the storage system includes:
    providing the one or more recommendations to a user of the storage system via a cloud-based computing platform.

12. The computer program product of claim 7 further comprising:
    receiving the one or more best practice models from a remote source.

13. A computing system including a processor and memory configured to perform operations comprising:
    receiving usage and configuration data from a storage system, wherein the usage and configuration data includes high availability utilization data that identifies the manner in which one or more high availability processes configured for providing redundancy for one or more portions of the storage system are utilized within the storage system including current configurations and alternative configurations of storage device high availability, network infrastructure high availability, and cache high availability;
    comparing the usage and configuration data to one or more best practice models to determine one or more recommendations, wherein the one or more best practice models define desired configurations for the storage device high availability, the network infrastructure high availability, and the cache high availability; and
    providing the one or more recommendations to a user of the storage system.

14. The computing system of claim 13 wherein the usage and configuration data includes:
    hardware utilization data that identifies the manner in which one or more hardware components are utilized within the storage system.

15. The computing system of claim 13 wherein the usage and configuration data includes:
   virtual object utilization data that identifies the manner in which one or more virtual objects are utilized within the storage system.

16. The computing system of claim 13 wherein comparing the usage and configuration data to one or more best practice models includes:
   identifying anomalous behavior within the usage and configuration data.

17. The computing system of claim 13 wherein providing the one or more recommendations to a user of the storage system includes:
   providing the one or more recommendations to a user of the storage system via a cloud-based computing platform.

18. The computing system of claim 13 further comprising:
   receiving the one or more best practice models from a remote source.

* * * * *